US009689965B2

(12) United States Patent
Hui

(10) Patent No.: US 9,689,965 B2
(45) Date of Patent: Jun. 27, 2017

(54) HOSTILE FIRE DETECTION FOR AN AIRBORNE PLATFORM

(71) Applicant: Siew Kok Hui, Singapore (SG)

(72) Inventor: Siew Kok Hui, Singapore (SG)

(73) Assignee: BITWAVE PTE LTD., Singapore (SG)

( * ) Notice: Subject to any disclaimer, the term of this patent is extended or adjusted under 35 U.S.C. 154(b) by 1316 days.

(21) Appl. No.: 13/623,824

(22) Filed: Sep. 20, 2012

(65) Prior Publication Data

US 2016/0291117 A1    Oct. 6, 2016

Related U.S. Application Data

(60) Provisional application No. 61/538,631, filed on Sep. 23, 2011.

(51) Int. Cl.
| | |
|---|---|
| *G01S 3/802* | (2006.01) |
| *G01S 3/84* | (2006.01) |
| *G01S 5/20* | (2006.01) |
| *G01S 3/803* | (2006.01) |

(52) U.S. Cl.
CPC .............. *G01S 5/20* (2013.01); *G01S 3/8034* (2013.01)

(58) Field of Classification Search
CPC ... G01S 3/84; G01S 3/802; G01S 5/20; G01S 3/8034
See application file for complete search history.

(56) References Cited

U.S. PATENT DOCUMENTS

| | | | | | |
|---|---|---|---|---|---|
| 2,925,582 | A * | 2/1960 | Blaise | ..................... | F41G 3/142 273/372 |
| 3,025,359 | A * | 3/1962 | Schilling | ................ | H04R 1/406 367/157 |
| 3,846,779 | A * | 11/1974 | Martner | ............. | G08B 13/1609 310/322 |
| 8,555,726 | B2 * | 10/2013 | Barger | ................... | G01H 11/08 367/127 |
| 2013/0160556 | A1 * | 6/2013 | Barger | ................... | G01H 11/08 73/645 |
| 2016/0291117 | A1 * | 10/2016 | Hui | ........................... | G01S 3/84 |

OTHER PUBLICATIONS

Duckworth et al.; Fixed and wearable acoustic counter-sniper systems for law enforcement; Nov. 5, 1998; 22 pages.*

* cited by examiner

*Primary Examiner* — Daniel Pihulic
(74) *Attorney, Agent, or Firm* — Amin, Turocy & Watson, LLP

(57) ABSTRACT

Systems and methods are presented for detecting a direction of an incoming projectile and determining a source location of the projectile. One or more resonant sensors (comprising a plate, piezo electric sensor, etc.) can be arranged, where shockwaves from the projectile (e.g., shockwaves from a bullet travelling at supersonic speeds) are incident upon the plate and cause the plate to resonate. The resonance causes an electrical signal to be generated by the piezo electric sensor (e.g., a piezo electric film sensor), the greater the degree of resonance in the plate, the higher the magnitude of signal generated by the piezo electric sensor. By comparing the magnitude of the piezo electric signals across the array of resonant sensors it is possible to determine a trajectory of the projectile and hence a location of the source of the projectile. Acoustic waves can also be generated by muzzle waves.

20 Claims, 11 Drawing Sheets

POSITION A

POSITION A

RESONANT SENSOR
DIRECTION

HOSTILE FIRE DETECTION FOR AN AIRBORNE PLATFORM

RELATED APPLICATIONS

This application claims priority to U.S. Provisional Application Ser. No. 61/538,631, filed on Sep. 23, 2011, entitled "System and Apparatus for Hostile Fire Detection of Airborne Platforms". The entirety of the above-captioned application is incorporated herein by reference.

TECHNICAL FIELD

The subject specification relates generally to detection of small arms fire and determination of a source location of the small arms fire, e.g., a sniper, with respect to a moving platform, such as a helicopter.

BACKGROUND

Given the major advances made with modern radar technologies regarding object detection, essentially two approaches have been developed to minimize detection of an aircraft. The first is use of stealth technologies to reduce the radar signature of an aircraft by such means as radar absorbent materials, non-metallic structures, shapes that deflect radar electromagnetic waves away from the radar source, and the like. However, such means can lead to aircraft that are costly to build as well as difficult to fly, for example, modern stealth aircraft are notoriously difficult to fly and require a high order of pilot assistance by onboard computer control and sensing systems.

Hence, a multitude of aircraft are in operational service which have minimal or no benefit of stealth technologies. For these aircraft, a second approach to minimizing detection by radar is low level flight. It is more difficult to detect an aircraft flying in low level flight, for example, on the horizon, at treetop level, etc., than it is to detect an aircraft flying in exposed flight against the broad expanse of sky. However, while low level flight can minimize detection of aircraft and accordingly reduce the ability for the enemy to engage the aircraft with weapons such as surface-to-air missiles, low level flight can place the aircraft within range of small arms fire, such as rifle fire. In view of flying in such a hostile environment, it would be beneficial for all on board the aircraft to identify that a projectile is proximate, is hitting, or has the potential to hit the aircraft and further for the source of the incoming projectiles to be determined. Such hostile engagement and according avoidance of small arms fire is particularly applicable to aircraft such as helicopters where the top speed of flight may not be as high as an aircraft such as a fighter jet, and also owing to a common operation of a helicopter being in stationary/near stationary flight, e.g., in a hover. By determining the helicopter is under enemy attack (even where the enemy aim is such that projectiles are not impacting the helicopter) the helicopter can be quickly maneuvered to a safer location and/or height, as well as engage the enemy with whatever weapons are available (e.g., onboard the helicopter) to the helicopter crew.

A conventional system for detecting a helicopter is under attack (e.g., by small arms fire) comprises a microphone array, a digital signal processor and a display system with audio warning signal. A microphone array forming the foundation of the system is typically designed with an array of omni directional microphones which can be employed to pick up acoustic signals from the firing source(s), where the acoustic signals can comprise of both shockwaves generated by the projectile (e.g., at supersonic velocity) and muzzle waves generated from the source muzzle owing to detonation of the explosive facilitating propulsion of the projectile. Utilization of the acoustic signals enables a shooter location to be estimated.

However, in various situations, the muzzle wave may not be detectable by the microphone array, and hence, in such situations, the shooter location has to be estimated from the shockwave alone. To facilitate shockwave detection only, a network of sensors (e.g., microphones) are required to achieve a reasonable degree of certainty regarding knowledge of the shooter location. However, for a flying platform, such as a helicopter, maintaining the array in a fairly fixed location with regard to the shooter location is not always feasible, with a resulting degradation in the level of certainty with which the location of the shooter can be established.

The omni-directional microphone or hydrophone utilized in such an array is typically broadband in nature to facilitate capture of the signature of the shockwave and muzzle wave as required for shooter location detection, false alarm control and signal classification. The broadband nature renders the array susceptible to receiving all other sounds in the vicinity of the array which can also lead to distortion of the acoustic signals of interest. Hence, use of such an array is problematic in a noisy environment such as on the airborne platform like helicopter which can be extremely noisy in operation, for example from the noise of the downdraught wind (wind noise) as well as mechanics of the rotary system (platform noise) powering the rotor blades.

Platform noise generated by aircraft, such as a helicopter, can be in the order of 145 dB. Noise of this magnitude will drown out all signals of interest (i.e., shockwaves and muzzle waves) rendering identification of the signals of interest an almost impossible task. Array processing techniques may be applied to place nulls into the direction(s) of the unwanted noises. However, if the front ends of the microphones' are already in a situation of being saturated by the noise, which is a likely scenario, it still may be impossible to extract the wanted signals by an array processing technique.

A vector sensor can be utilized in a position to render a null in the noise source direction. However vector sensors are extremely susceptible to wind noise, thus rendering them unsuitable for application in a moving platform such as a helicopter.

Wind noise can be even more devastating to the array, even when filtering of the wind noise is conducted. However for a flying platform, such as a helicopter, flight speed can be high accompanied by noise generated by the downward thrust of air from the rotors, leading to complete saturation of the microphone front ends.

SUMMARY

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

The various exemplary, non-limiting embodiments presented herein relate to detection of a projectile, trajectory of the projectile and determination of a source of the projectile, where the projectile can be a bullet, round, etc., from small arms fire. Detection of the small arms fire is made with reference to an airborne platform such as a helicopter.

In an exemplary, non-limiting embodiment, a resonant sensor is presented comprising of a plate and a piezo electric sensor attached thereto. Shockwaves from a passing projectile can lead to generation of resonance in the plate, which cause the piezo sensor to generate electrical signals. The greater the shockwave (e.g., closer proximity of the projectile) the greater the degree of plate resonance and accordingly, the higher order of magnitude of electrical signal produced.

In a further exemplary, non-limiting embodiment, a plurality of resonant sensors can be combined to form a resonant sensor array, for example a plurality of resonant sensors can be incorporated into a support structure to facilitate 360 degree coverage of a region. Furthermore, a plurality of resonant sensor arrays can be combined to detect passage of a projectile. A process similar to a multibeam array analysis can be performed where electrical signal(s) generated by the plurality of resonant sensors in the plurality of resonant sensor arrays can be analyzed to identify a trajectory of the projectile, and further, by triangulation and/or extrapolation a location of the source of the projectile (e.g., a rifleman on the ground) can be inferred. With knowledge of a source of an incoming projectile a pilot can maneuver the helicopter to be in position that is out of projectile range, engage the enemy location, etc.

In another exemplary, non-limiting embodiment, passage of more than one projectiles can be determined by analyzing signal strength of the electrical signals generated by one or more resonant sensor arrays. Analysis of electrical signals received from a resonant sensor array can identify signal strengths associated with a first projectile, a second projectile, etc. Thus it is possible extract signals pertaining to a particular projectile from a plurality of signals associated with at least one other projectile(s).

In a further exemplary, non-limiting embodiment, determination of a projectile trajectory, and anticipated future projectile trajectory can be presented to a pilot via a graphical display component, as well as being utilized by a system utilized to control operation of the helicopter. Data received and generated by the various components comprising the systems presented herein can be transmitted to an external system (e.g., battle headquarters) to facilitate knowledge of a scene of conflict as well as to further advise the helicopter pilot and/or control operation of the helicopter.

The resonant sensor utilizing a piezo electric sensor output enables operational noise (e.g., from the helicopter engine(s) and rotor noise) and wind noise to be ignored. A resonant sensor can be constructed having a high quality Q which is able to capture the high energy and/or frequency shockwaves generated by a projectile (e.g., travelling at supersonic speed) while being unaffected by the lower energy and/or lower frequency acoustic waves associated with operational noise and/or wind noise. The plate can be designed (e.g., machined, cast, near-net-shape formed) such that the resonant frequency of the plate matches the frequency of the projectile shockwave(s) so as to maximize the signal to noise ratio of the electrical signal generated by the piezo sensor.

The plate can be constructed from aluminium or other suitable material (e.g., other metal, metal alloy, composite). The support structure can be constructed from steel or other suitable material (e.g., other metal, metal alloy, metal matrix composite, composite, etc.), with the support structure isolating the resonant sensor(s) from vibration generated by the helicopter (e.g., the helicopter engines, rotors, etc.). The resonant sensor(s) can be embedded to be flush with the surface of the support structure to provision good aerodynamics, and further the support structure can be formed to have an aerodynamic profile.

The resonant sensor array can be designed to provide 360 degree coverage (e.g., 8 sensors located on a circular support structure) however any suitable arrangement of sensors can be configured, e.g., a two dimensional array or other configuration as required to achieve a desired coverage.

DETAILED DESCRIPTION

Figure 1:
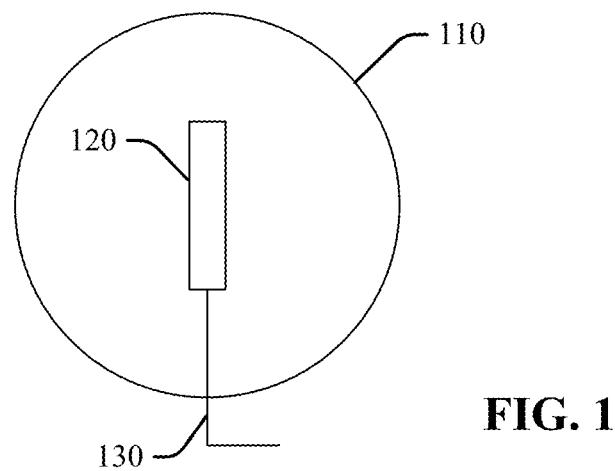
FIG. 1 is a block diagram illustrating an exemplary, non-limiting embodiment for detecting small arms fire and identifying location of the source.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It can be evident, however, that the claimed subject matter can be practiced without these specific details. In other instances, well-known structures and devices are shown in block diagram form in order to facilitate describing the claimed subject matter.

The subject innovation presents various systems and methods relating to detection of small arms fire and inferring a location of the source of the small arms fire. As previously described, to avoid detection by radar-based systems aircraft fly in low-level operations, however such low-level operation places the aircraft within range of small arms fire. To minimize the likelihood of being hit and/or being shot down, it is important to identify that the aircraft is being hit by small arms fire, and further, the source of the small arms fire is to be determined. However, conventional systems based on detection of acoustic signals (e.g., projectile shockwaves and muzzle waves) are limited in their ability to accurately discern such acoustic signals owing to the high degree of motion of an aircraft such as a helicopter combined with the noise generated by operation of the helicopter (e.g., downdraught wind noise). By utilizing a system based on signals generated by piezo electric devices the difficulties associated with detection by conventional systems can be mitigated, enabling the pilot to quickly ascertain the direction/source of the incoming round(s) and fly the helicopter to a position out of range of the envelope of the incoming round(s).

Rather than employing a conventional air acoustic microphone or hydrophone to detect acoustic signals, in an exemplary, non-limiting embodiment a resonant sensor is utilized to detect incoming projectiles and further, to identify the source of the small arms fire. Utilization of the various exemplary, non-limiting embodiments presented herein can facilitate (in a non-limiting list):

a) detection and localization of small arms fire against low flying airborne platforms;

b) weapon launch point and impact detection such as mortar fire or rocket fire;

c) detection and localization of small arms fire against ground moving platforms; and d) detection of low flying unmanned aerial vehicles (e.g., UAVs or drones) or helicopters by tuning the sensors to the frequency of the platforms.

FIG. 1 illustrates an exemplary, non-limiting embodiment comprising a plate with a piezo sensor attached thereto. Plate 110 can comprise of aluminum, or any other suitable material (e.g., other metal, composite material, and the like), where shockwaves (e.g., FIG. 2, wave 280) generated by a projectile (e.g., FIG. 2, projectile 270) causes plate 110 to resonate, whereby resonance of plate 110 is sensed by piezo sensor 120 (for example a piezo electric film sensor or other device operating with a piezo electric effect technology). Any electrical signals resulting from operation of the piezo sensor 120 (e.g., as effected by resonance of plate 110) can be transmitted along electrical connection 130, along with conveyance of any electrical energy required, as necessary, to energize the piezo sensor 120. As plate 110 resonates the piezo sensor 120 is mechanically deformed which leads to generation of an electric charge, the greater the degree of deformation the higher the magnitude of electric charge. Detection of the resonance of plate 110, in association with piezo effect signals generated by piezo sensor 120, facilitate detection and localization of the source of small arms fire (e.g., a rifleman) with respect to the position of the helicopter.

It is to be appreciated that while the various exemplary, non-limiting embodiments presented herein relate to an aircraft platform, such as a helicopter, the various embodiments are not so limited and are applicable to any situation in which the various conditions and factors presented herein are suitable (e.g., a motorized vehicle, a drone aircraft, a ship, etc.).

Figure 2:
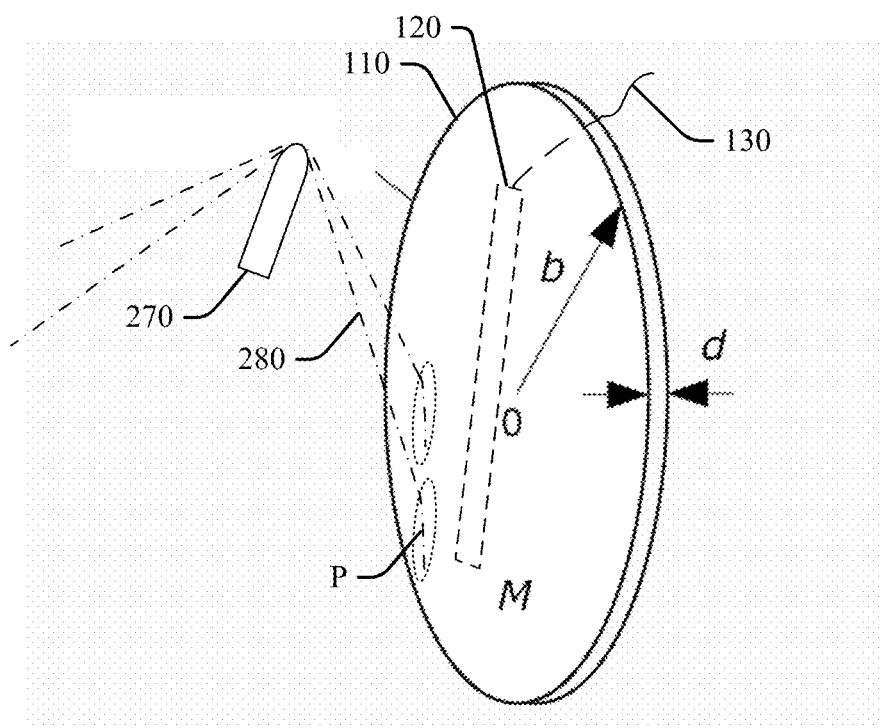
FIG. 2 is a block diagram illustrating an exemplary, non-limiting embodiment for detecting small arms fire and identifying location of the source.

Design of plate 110 is such that the resonant frequency of plate 110 matches the frequency of the shockwave(s) and hence maximize the signal to noise ratio (SNR) of the plate resonance, and accordingly, signal generation by the piezo sensor 120. FIG. 2 illustrates a number of parameters to be considered in the design of plate 110, such as plate thickness d and plate radius b, which (in conjunction with the plate material density) correspondingly determine the mass M of plate 110. As illustrated in FIG. 2, projectile 270 (e.g., a bullet) is passing within close range of plate 110 such that a portion of shockwaves 280 impinge of plate 110 at region P, which generates resonance in plate 110. As mentioned, the resonant frequency of plate 110 is designed to match the shockwaves frequency so as to maximize the SNR of the received signal. The resonant frequency can be derived empirically. For example, a projectile travelling at supersonic speed produces a shockwave which impinges on a plate and causes the plate to resonate at a natural frequency of the plate. It is to be appreciated that while the various exemplary embodiments presented herein are described with reference to a shockwave(s) being generated by a projectile, other waves such as muzzle waves are equally applicable to the various embodiments presented herein.

In an exemplary, non-limiting embodiment, it is preferable that the resonant frequency be chosen to reside at the highest possible frequency region displaced from the wind noise and the operating noise of the helicopter. Operating noise (e.g., engine noise, rotor noise, etc.) is typically dominant at the low frequency region of the acoustic spectrum, and hence, plate 110 can be designed to produce resonance at a higher frequency further away from the operating noise end of the spectrum. Further, the resonant sensor is characterized by a high quality factor Q that further enables it to reject operating noise and wind noise outside of its bandwidth. By having a high Q a lower rate of energy loss occurs relative to the stored energy of the plate 110, and thus the oscillations set up in plate 110, owing to incidence of shockwaves 280 on the surface of plate 110, result in the oscillations in plate 110 dying out at a slower rate than for a plate having a low Q. Hence, in a system comprising a plate 110 having a high Q, operating noise and wind noise are unlikely to cause plate 110 to resonate.

Figure 3A:
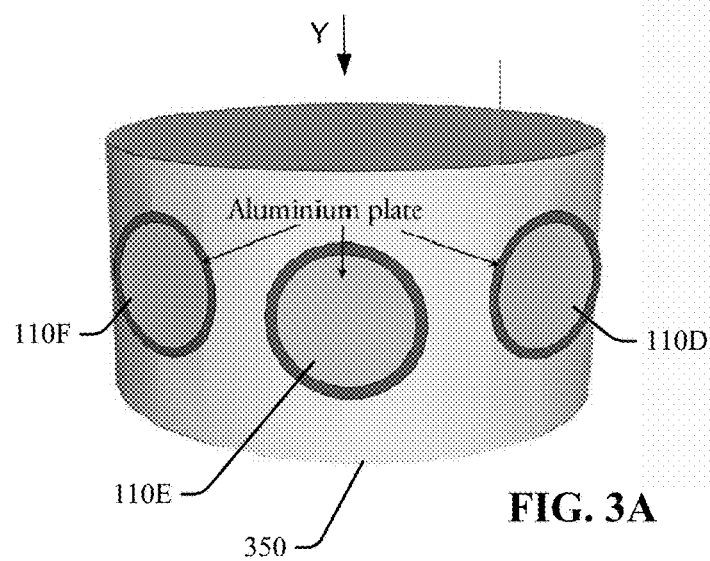
FIG. 3A is a side view block diagram illustrating an exemplary, non-limiting embodiment for detecting small arms fire and identifying location of the source.
Figure 3B:
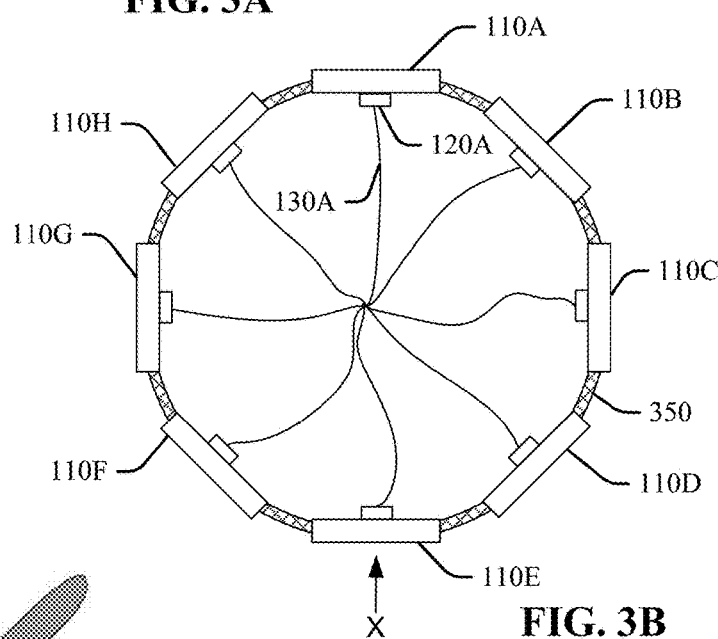
FIG. 3B is a plan view block diagram illustrating an exemplary, non-limiting embodiment for detecting small arms fire and identifying location of the source.

As illustrated in FIGS. 3A and 3B, a resonant sensor (e.g., comprising plate 110 and piezo sensor 120) can be embedded into a support structure which is designed to be isolated from any mechanical vibration of the helicopter. Several resonant sensors (e.g., plates 110A-H, piezo sensors 120A-H and connectors 130A-H (where for sake of illustration only piezo sensor 120A and connector 130A are identified)) can be incorporated into support structure 350 to facilitate formation of a sensing array (e.g., akin to a microphone array previously described in the Background) to provide a desired degree of coverage. Support structure 350 can be constructed from any suitable material which can act to dampen mechanical vibrations received from the helicopter, where such material can comprise of steel, a steel composite, metal matrix composite, composite, and the like. As shown in FIG. 3A (side view in direction X) and FIG. 3B (top view in direction Y), a sensor array is formed having 360 degrees coverage where eight resonant sensors (e.g., plates 110A-H and piezo sensors 120A-H) are combined with support structure 350. It is to be appreciated that any array configuration can be generated based upon particular combination of resonant sensor array(s) and support structure, for example, a two dimensional array or an array having any required geometry. Hence the resonant sensor array can be constructed in any arrangement comparable to the aforementioned microphone array. In an associated aspect, a resonant sensor can be constructed with a configuration to facilitate construction of a sensor array having beamforming characteristics. Beamforming can facilitate enhancement of the detection of projectile shockwaves and hence enable determination of angle of arrival of the projectile and the location of the rifleman. In an alternative configuration, a widely spaced linear array of two or more sensors can be combined in any geometric configuration. As illustrated in FIGS. 3A and 3B, support structure 350 can have an aerodynamic profile to facilitate reduction in wind noise.

Figure 4:
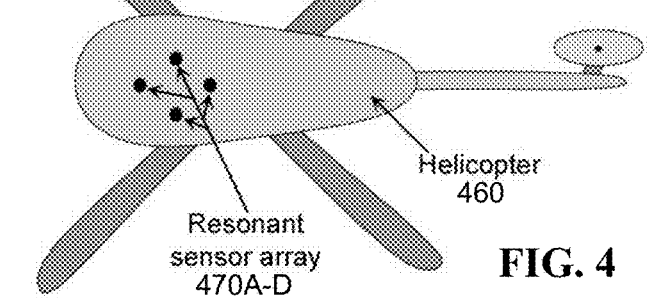
FIG. 4 is a block diagram illustrating an exemplary, non-limiting embodiment for locating a detection system on a helicopter.

FIG. 4 illustrates an exemplary, non-limiting embodiment of an arrangement of a plurality of resonant sensor arrays located on a moving platform, such as a helicopter. As previously described with regard to FIGS. 3A and 3B, a number of plates (e.g., plates 110A-H) and associated components (e.g., piezo sensors 120A-H and electrical connections 130A-H) can be arranged in a support structure to form a resonant sensor array. As shown in FIG. 4, a plurality of resonant sensor arrays (e.g., sensor arrays 470A-D) can be located on the fuselage of helicopter 460. Such an arrangement of resonant sensors can form an array of detectors to facilitate detection of a direction of an incoming projectile (e.g., a rifle round) and accordingly determination of the location of the source of the projectile, e.g., the rifleman.

Figure 5:
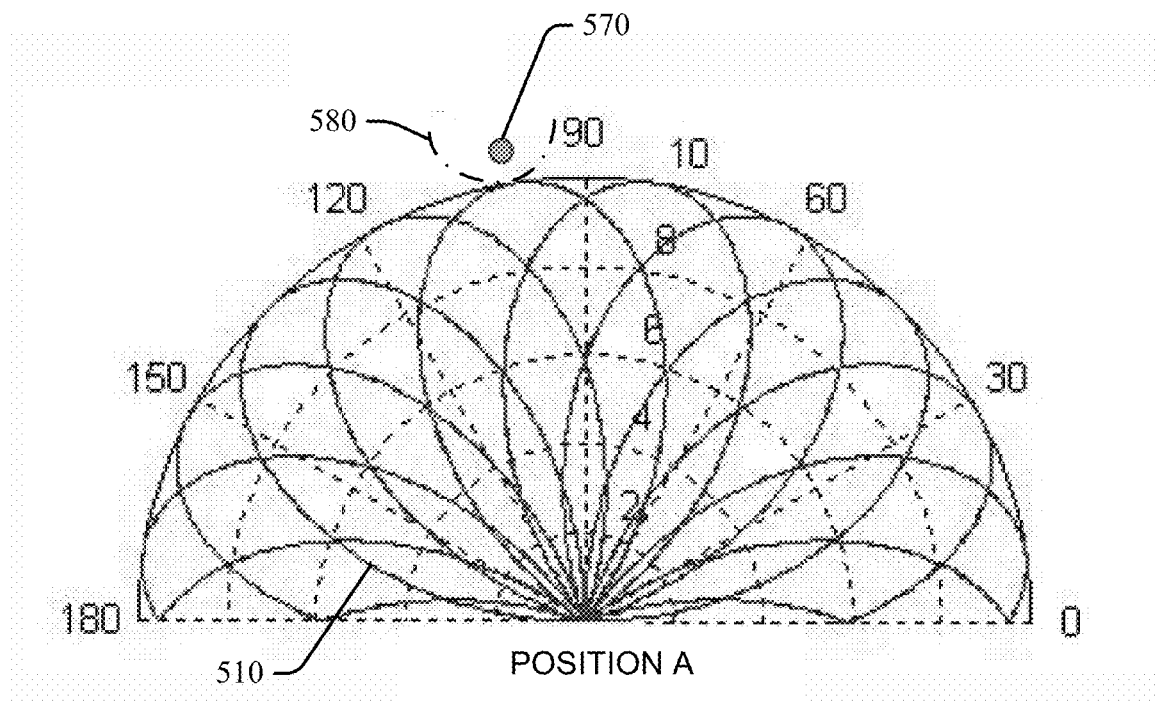
FIG. 5 is a block diagram illustrating an exemplary, non-limiting embodiment for detecting a projectile shockwave impinging on a resonant sensor array.
Figure 6:
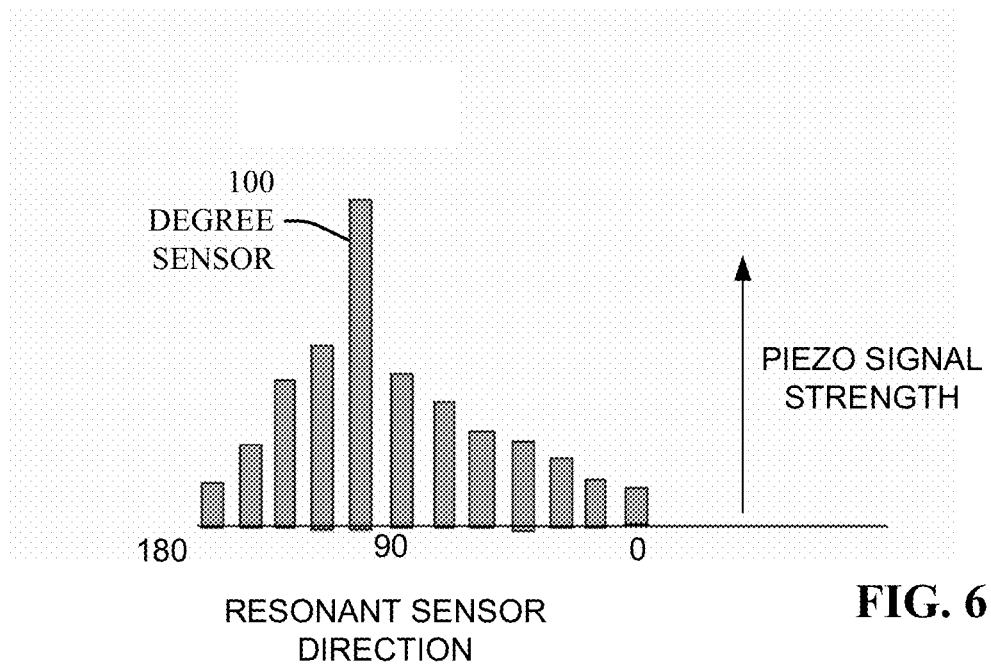
FIG. 6 is a block diagram illustrating an exemplary, non-limiting embodiment for detecting a projectile shockwave impinging on a resonant sensor array.

FIG. 5 illustrates a stylized depiction of an array of resonant sensors where the area covered by each resonant sensor in an array located at position A (e.g., a resonant sensor array located on a helicopter fuselage at any of positions 470A-D) is presented as a coverage area beam 510. In the depiction, a plurality of area beams 510 are illustrated covering a range of 180 degrees. A shockwave 580 emanating from projectile 570 arrives at the resonant sensor array aligned on an axis between 90 degrees and 120 degrees, in this scenario aligned at approximately 100 degrees. Given the proximity of projectile 570 to the resonant sensor aligned at 100 degrees, it is anticipated that the resonant sensor located on this axis will have the highest degree of resonance with the degree of resonance fading for each resonant sensor as each sensor diverges away from the 100 degree alignment. Owing to the shockwave 580 having the highest energy in the region of the 100 degree alignment, the plate (e.g., any of plates 110A-H) associated with this beam will have the highest level of resonance induced by shockwave 580 and accordingly, as mentioned previously, the greater the level of resonance the greater the electrical output of the associated piezo sensor (e.g., respective film sensor 120A-H). Such an effect is depicted in FIG. 6 illustrating a bar chart comprising respective normalized energies received from each of the resonant sensors comprising the array at point A. As shown the resonant sensor with the highest magnitude piezo electrical signal is for the sensor location at 100 degrees, with a corresponding reduction in magnitude of piezo electrical signal for each respective sensor aligned away from the 100 degree resonant sensor.

Figure 7:
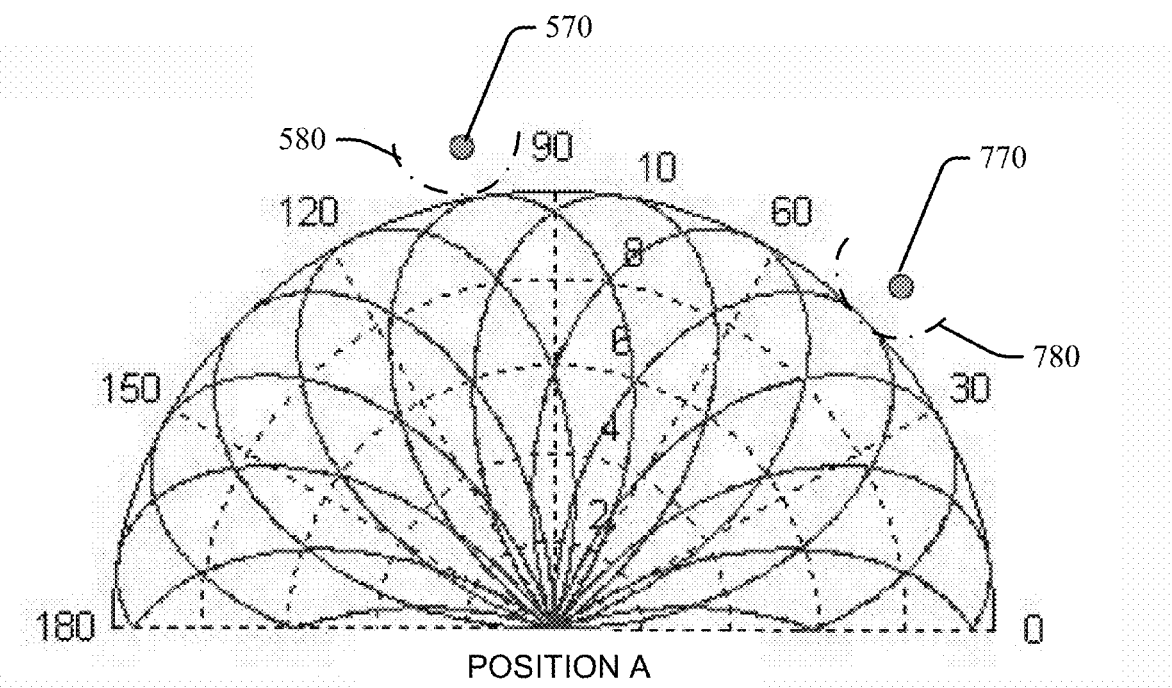
FIG. 7 is a block diagram illustrating an exemplary, non-limiting embodiment for detecting a plurality of projectile shockwaves impinging on a resonant sensor array.
Figure 8:
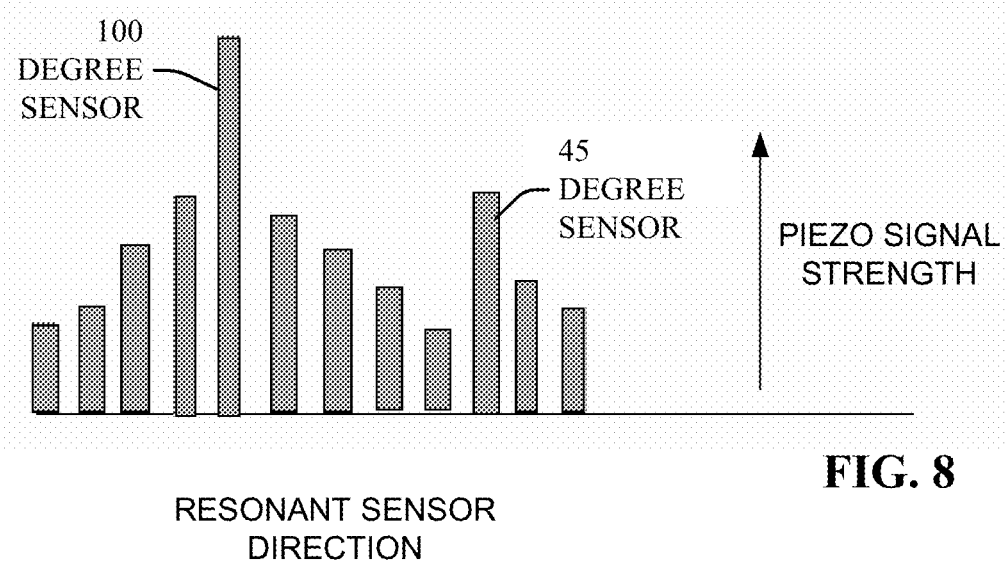
FIG. 8 is a block diagram illustrating an exemplary, non-limiting embodiment for detecting a plurality of projectile shockwaves impinging on a resonant sensor array.

Turning to FIG. 7, a pair of projectiles 570 and 770 are depicted with respective shockwaves 580 and 780 being incident upon the resonant sensor array located at position A. Similar to FIG. 5, projectile 570 is closest to the resonant sensor aligned on the 100 degree axis, while projectile 770 is closest to the resonant sensor aligned along the 45 degree axis. Owing the normalized energies received from the respective piezo sensors in response to shockwaves 580 and 780 being incident upon them, a unique energy distribution (or pattern) results as shown in the normalized energy graph depicted in FIG. 8. As illustrated in FIG. 8 a highest order of magnitude piezo electric signal (e.g., from projectile 570) is received from the resonant sensor aligned on the 100 degree axis, while it is also possible to discern from the normalized energy graph that the sensor aligned along the 45 degree axis is also recording a projectile (e.g., projectile 770) in the vicinity thereof.

Hence, as illustrated in FIGS. 5-8, it is possible to develop a data driven model (DDM) to estimate a number of shockwaves incident upon a resonant sensor array (e.g., a resonant sensor array located at position A) at any given moment in time. Any data driven model can be utilized to facilitate determination of one or more projectiles (e.g., projectile 570, projectile 770), for example, a Gaussian mixture model (GMM) or an artificial neural network (ANN).

Figure 9:
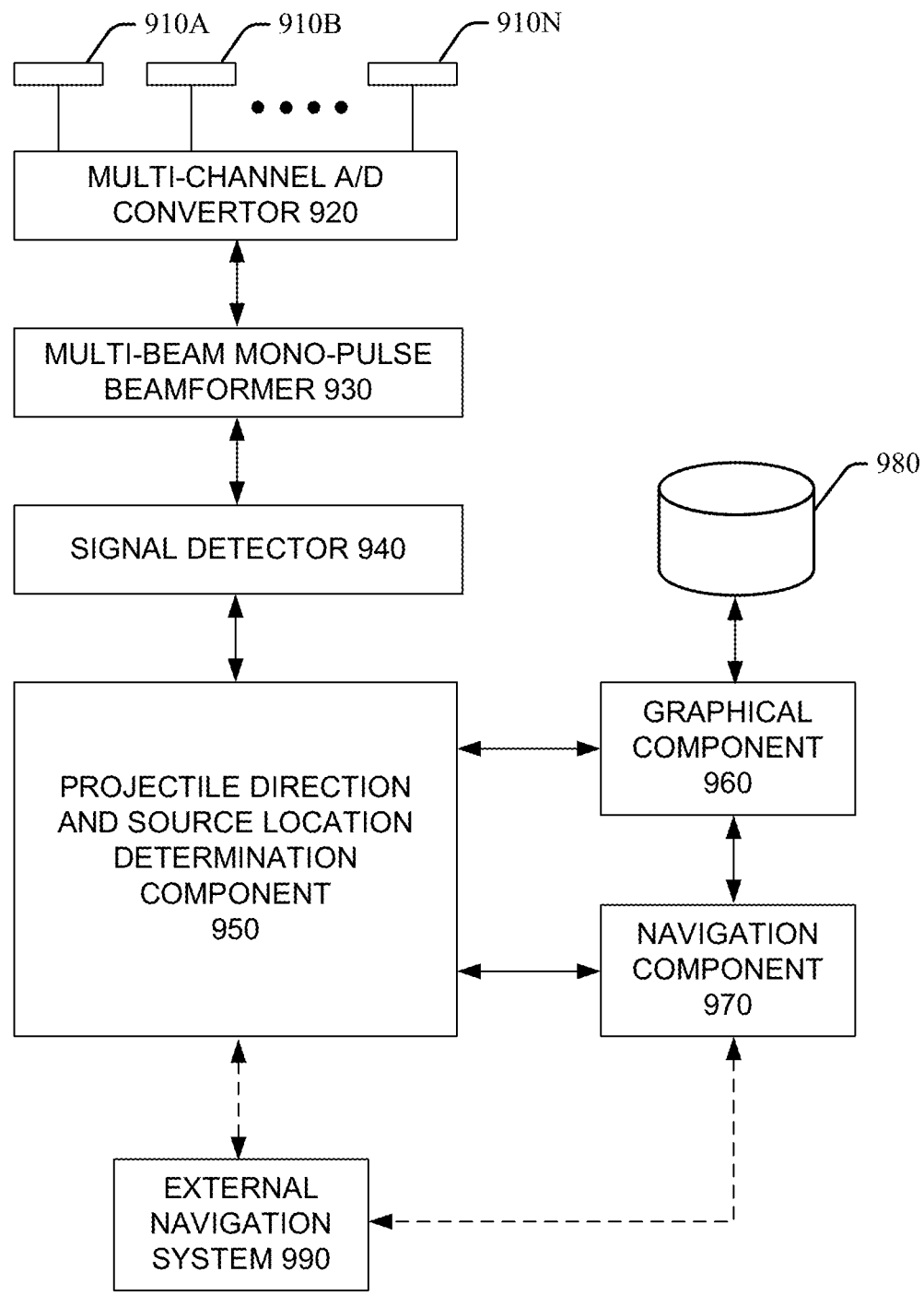
FIG. 9 is a block diagram illustrating an exemplary, non-limiting embodiment for detecting one or more projectiles with a resonant sensor array.

FIG. 9 illustrates an exemplary, non-limiting embodiment for acoustic signal acquisition to facilitate detecting shockwaves generated by projectiles. A plurality of resonant sensors 910 (e.g., resonant sensors 910A, 910B . . . 910N, where N is a positive integer) are arranged to form an array having a desired degree of coverage (e.g., 360 degrees), where each resonant sensor comprises a plate (e.g., plate 110), piezo sensor (e.g., piezo sensor 120), and associated equipment (e.g., electrical connection 130) as previously described. The array of sensors 910A-N are coupled to a multi-channel analog/digital convertor 920 which in conjunction with a multi-beam mono-pulse beamformer 930 provide necessary signal conditioning to facilitate detection of electrical signals at signal detector 940. A projectile direction and source location determination (PDSL) component 950 receives the signals from signal detector 940, and based on the received signals determines the proximity and trajectory of a projectile in association with the location of the source of the projectile (e.g., location of a sniper). The PDSL component 950 can perform various signal determinations as depicted in FIGS. 5-8 and as further described below. To facilitate communication of determinations generated by PDSL component 950, a graphical component 960 can be incorporated into the helicopter cockpit (e.g., as a standalone device, incorporated into the instrument panel, as part of a head-up-display component, and the like) to convey to the helicopter pilot any information to enable the pilot to make a determination of the source of the projectile(s) (e.g., location of a sniper in a building) and perform any suitable action such as flying the helicopter to a position that is out of range of the sniper, engage the sniper position, etc. Further, information generated by PDSL component 950 can also be conveyed to an on-board navigation component 970, where the information can be utilized to assist in navigation of the helicopter by either the pilot or a backup system such as an auto-pilot system. It is to be appreciated that the graphical component 960 and navigation component 970 can be separate devices or incorporated into a single device. Further, it is to be appreciated that graphical component 960 and navigation component 970 can comprise of any necessary subcomponents to facilitate interaction with either of graphical component 960 and navigation component 970, where the subcomponents can comprise of a human-machine-interface (HMI), keyboard, touchscreen, voice signal activation and processing, etc. Data (e.g., signals from the respective resonant sensors 910, data generated by PDSL component 950, etc.) recorded during operation of the helicopter can be stored in data store 980 for subsequent retrieval/processing either during the flight or upon return to the helicopter base, for instance. Further, an external navigation system 980 can be associated with the PDSL 950, navigation component 970, etc., to facilitate data being captured/processed at the helicopter system (e.g., from the resonant sensors 910, signal processing, PDSL component 950, graphical presentation of graphical component 960, navigation data associated with navigation component 970, etc.) to be transmitted back to an external location (e.g., the helicopter base, a remotely located control station such as a flight control system located on a different continent as used to control drones, central command, etc.) to facilitate assistance by back up personal (e.g., battlefield analysts) to review the data and determine options available/commands to relay to the helicopter in view of the received data in conjunction with other data (e.g., data received from other helicopters forming the helicopter squadron), and the like.

Figure 10:
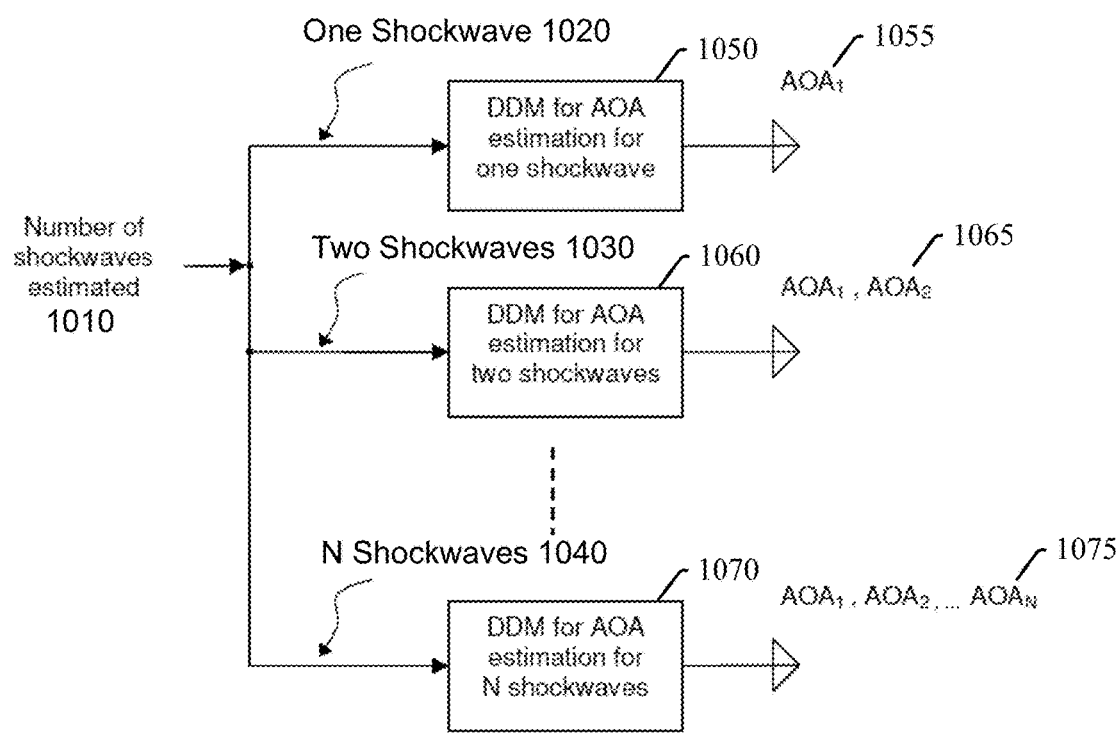
FIG. 10 is a block diagram illustrating an exemplary, non-limiting embodiment for detecting one or more projectiles with a resonant sensor array.

FIG. 10 depicts an exemplary, non-limiting embodiment for determination of angle of arrival (AOA) for one or more projectiles, where such determination can be performed by a system located onboard an aircraft such as a helicopter. Signals (as previously described with reference to FIG. 9) are received at a PDSL component (e.g., PDSL component 950) from which a number of shockwaves 1010 can be estimated (e.g., as previously described with reference to FIGS. 5-8). In the scenario of one shockwave 1020 being detected, DDM analysis 1050 can be performed to determine $AOA_1$ 1055 for the projectile, where $AOA_1$ 1055 can be subsequently utilized to generate information for presentation to the pilot (e.g., via graphical component 960, navigation component 970, etc.) upon which the pilot can accordingly act. In the scenario of two shockwaves 1030 being detected, DDM analysis 1060 can be performed to determine $AOA_1$ and $AOA_2$ 1065 for the projectiles, where $AOA_1$ and $AOA_2$ 1065 can be subsequently utilized to generate information for presentation to the pilot. In the scenario of N shockwaves 1040 being detected, DDM analysis 1070 can be performed to determine $AOA_1$, $AOA_2$ . . . $AOA_N$ 1075 (where N is a positive integer) for the N projectiles, with $AOA_1$, $AOA_2$ . . . $AOA_N$ 1075 being subsequently utilized to generate information to be presented to the pilot.

Figure 11:
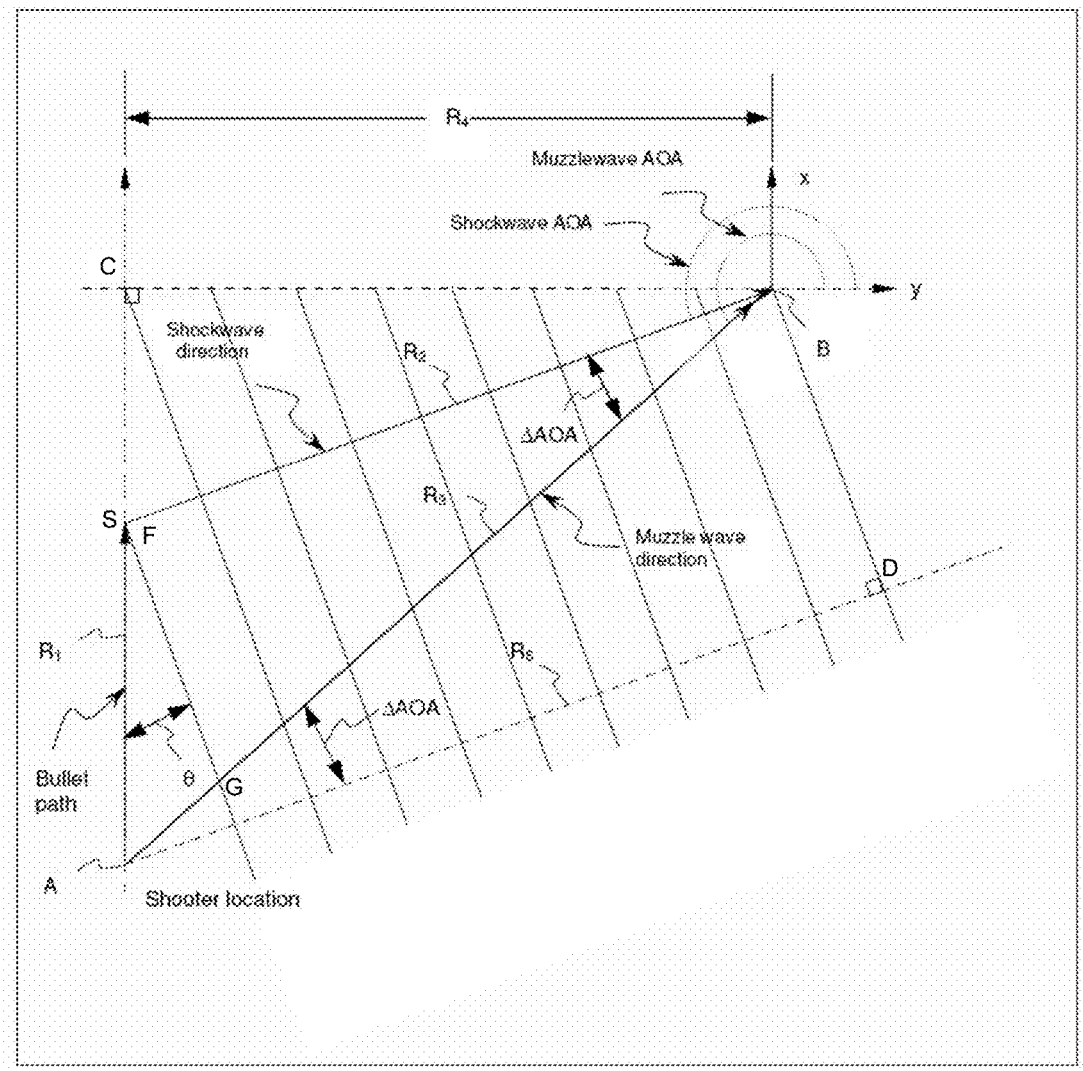
FIG. 11 is a block diagram illustrating an exemplary, non-limiting embodiment for detecting one or more projectiles with a resonant sensor array.

FIG. 11 depicts an exemplary, non-limiting embodiment for determination of angle of arrival (AOA) for one or more projectiles, where such determination can be performed by a system located onboard an aircraft such as a helicopter. A DDM can be used to estimate the closest point of approach of a projectile with respect to a resonant sensor array (e.g., resonant sensor array 110A-H) as indicated as point C in FIG. 11. To determine the shooter location, another point that needs to be provided is S point as indicated in FIG. 11. Point S can be derived by triangulation using arrays mounted on a platform, such as resonant sensor array 470A-D located on helicopter 460, as shown in FIG. 4. As previously described, particularly with reference to FIGS. 5-8, utilization of a plurality of sensing plate arrays can facilitate determination of a trajectory of a bullet, from which a location of a shooter location can be extrapolated. FIG. 11 illustrates a determined direction of travel of shockwave(s) R2 emanating from a bullet along with the determined muzzle wave(s) direction R3. Shockwave direction R2 and muzzle wave direction R3 can be determined in part based on the respective shockwave AOA and muzzle wave AOA, which are determined with reference to x and y co-ordinates at a resonant sensor array in conjunction with direction R4. With knowledge of the shockwave direction R2 it is possible to construct a shockwave vector triangle BCS which is a right angled triangle with shockwave R2 as the hypotenuse. Further a muzzle wave vector triangle BDA can be generated with muzzle wave R3 as the hypotenuse and further owing to the muzzle wave having as a source the rifle (compared with the shockwave emanating from a moving bullet) and thus a position (A) of the shooter location along muzzle wave direction R3 can be determined. By determining the difference between the muzzle wave AOA and the shockwave AOA it is possible to identify a $\Delta AOA$, where $\Delta AOA$ acts as a reference angular relationship between shockwave direction R2 and muzzle wave direction R3. Note the relationship between BDA and BCS based on application of $\Delta AOA$ and right angles occurring at C and D, to form BFG. Based on the relationship between BDA and BCS it is possible to define $\Theta$, and the line formed between C and S can be extrapolated until it coincides with the muzzle wave direction R3 which enables the shooter location A to be determined. Hence, as illustrated in FIG. 11, by knowing a shockwave AOA, a muzzle wave AOA and an angular difference $\Delta AOA$, knowledge can be generated (e.g., according to known methods of multi-beam monopulse beamformer and manufacture for achieving the various structures presented herein) to facilitate determination of a shooter location A relative to the sensing plate array located on a platform such as a helicopter.

Figure 12:
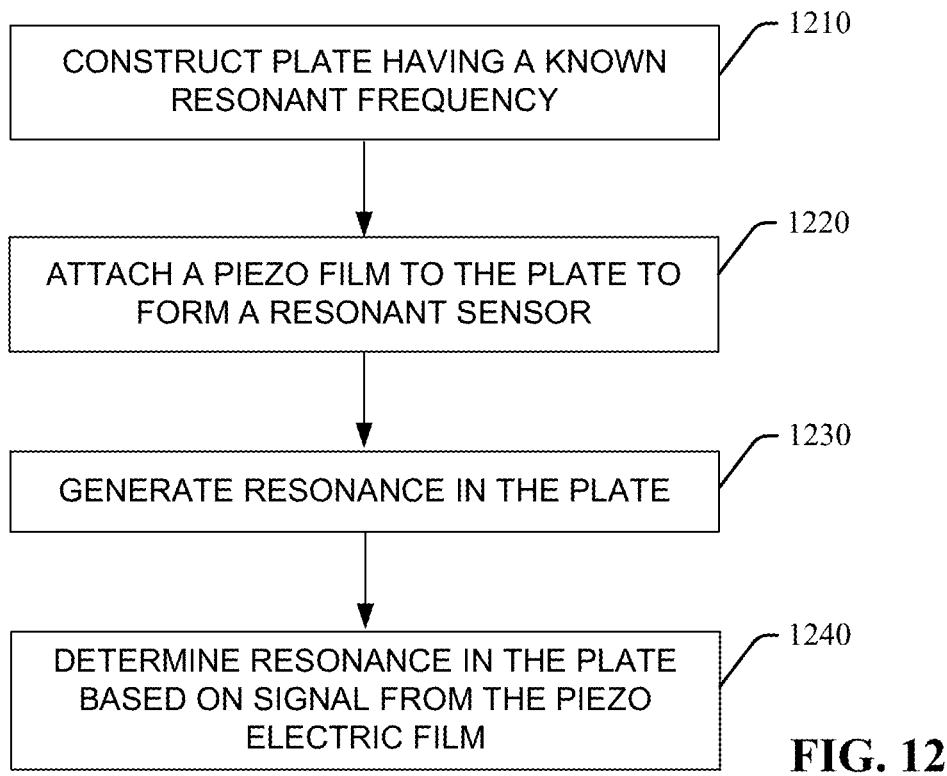
FIG. 12 is a flow diagram illustrating an exemplary, non-limiting embodiment for construction and operation of a resonant sensor.

FIG. 12 presents a flow diagram illustrating an exemplary, non-limiting embodiment to facilitate acoustic signal acquisition to facilitate detecting shockwaves generated by projectiles. At 1210, a plate (e.g., plate 110) is formed (e.g., by machining, near-net shape forming, casting, etc.) with dimensioning (e.g., plate thickness d and plate radius b, which correspondingly determine plate mass M) required to facilitate construction of a resonant sensor having a high quality factor Q. A high quality Q enables the plate to not be susceptible to operating noise and wind noise, where such operating noise and wind noise forms acoustic signals with a lower energy/frequency than acoustic waves (e.g., shockwaves) generated by a projectile travelling at high velocity (e.g., supersonic speed).

At 1220, a piezo sensor (e.g., piezo sensor 120) is attached to the plate, along with any associated components (e.g., electrical connector 130) to form a resonant sensor.

At 1230, a resonance effect is generated in the plate (e.g., in response to shockwaves from a projectile being incident upon the plate), and as the plate resonates the piezo sensor is mechanically deformed leading to generation of an electric charge.

At 1240, based on the electric charge generated by the piezo sensor (e.g., received at PDSL component 950) the proximity of a projectile to the plate can be determined.

Figure 13:
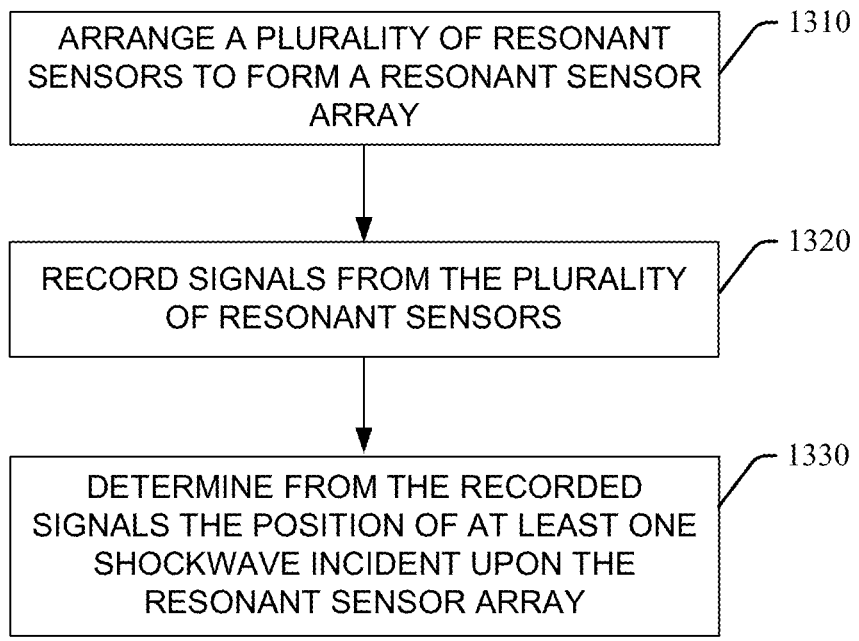
FIG. 13 is a flow diagram illustrating an exemplary, non-limiting embodiment for construction and operation of a resonant sensor array.

FIG. 13 presents a flow diagram illustrating an exemplary, non-limiting embodiment of a plurality of resonant sensors being utilized to facilitate acoustic signal acquisition for detection of shockwaves generated by a projectile(s). At 1310, a plurality of resonant sensors (e.g., resonant sensors 910A-N) are combined into a support structure (e.g., support structure 350) to form a resonant sensor array (as shown in FIGS. 3A and 3B). A plurality of resonant sensor arrays (e.g., resonant sensor arrays 470A-D) can be located on a platform (e.g., helicopter 460) to facilitate coverage of a desired area, for example 360 degree coverage on the underside of the helicopter fuselage.

At 1320, one or more signals can be received from one or more resonant sensors from one or more resonant sensor arrays. As a projectile passes in the vicinity of the one or more resonant sensor arrays, shockwaves from the projectile are incident upon at least one or more resonant sensors comprising the one or more sensor arrays. The incident shockwaves cause resonance to occur in the one or more resonant sensors with a corresponding electrical charge being generated by a piezo sensor (e.g., piezo sensors 120A-H).

At 1330, the electric charge(s) generated by the respective piezo sensors are received at a determination component (e.g., PDSL component 950). Based on DDM analysis in conjunction with identification of which projectile has caused resonance to be establish in one or more resonant sensors comprising one or more resonant sensor arrays it is possible to determine a trajectory of the projectile and based on subsequent triangulation/extrapolation it is possible to infer the location of the source of the projectile, e.g., a rifleman on the ground.

Figure 14:
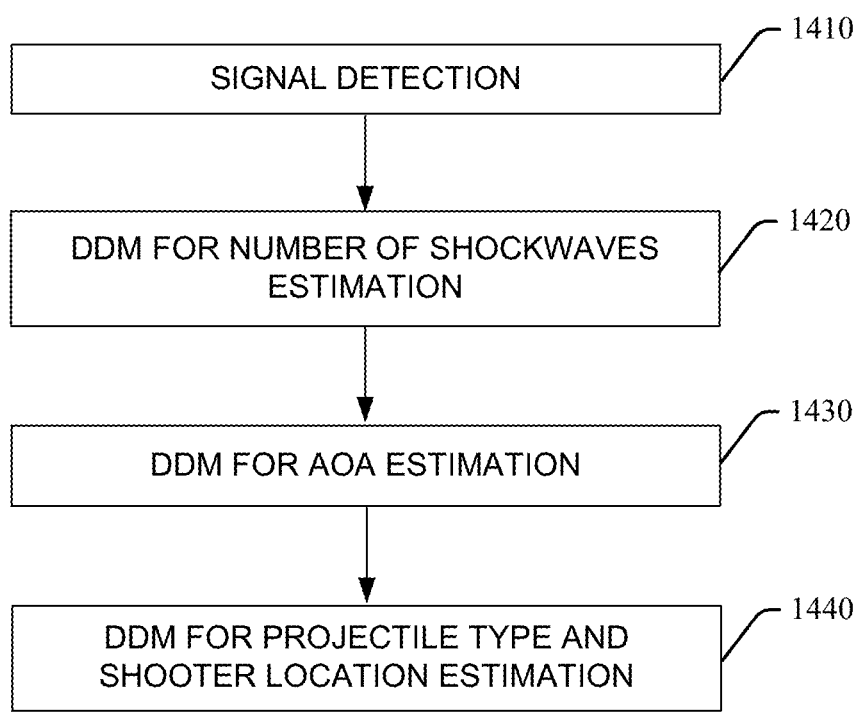
FIG. 14 is a flow diagram illustrating an exemplary, non-limiting embodiment for determination of one or more projectile trajectories.

FIG. 14 presents a flow diagram illustrating an exemplary, non-limiting embodiment of a plurality of resonant sensors being utilized to facilitate acoustic signal acquisition for detection of shockwaves generated by a projectile(s).

At 1410, one or more shockwaves (e.g., shockwave 280) or muzzle waves are received at one or more resonant sensor arrays (e.g., resonant sensor arrays 470A-D) located on a platform (e.g., helicopter 460). A number of shockwaves may arrive at one or more sensors comprising the resonant sensors as multiple shots may be fired at the platform simultaneously from different locations.

At 1420, DDM analysis can be performed for one or more shockwaves/muzzle waves being detected at the resonant sensor array (e.g., the DDM analysis can be performed by PDSL component 950 based on piezo electric signals received from signal detector 940).

At 1430, analysis can be performed to facilitate determining AOA's associated with the one or more shockwaves/muzzle waves.

At 1440, analysis of the respective AOA's can be performed by any suitable technique, multi-beam monopulse beamforming (e.g., in conjunction with the analysis illustrated in FIG. 11) to facilitate estimation of the location(s) of a shooter(s) (e.g., FIG. 11, shooter location A) and estimation of other projectile parameters such as velocity with respect to the platform.

Embodiments, systems, and components described herein, as well as aircraft systems and operational environments in which various aspects set forth in the subject specification can be carried out, can include computer or network components such as servers, clients, controllers (e.g., a flight system operated by a pilot, an autopilot system), communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term controller as used herein can include functionality that can be shared across multiple components, systems, and/or networks. As an example, one or more automation controllers can communicate and cooperate with various network devices across the network, wherein the network can be confined to an on-board configuration incorporated into the platform of interest (e.g., a helicopter) or the network can comprise an extended system comprising one or more helicopters, land based command center, airport, satellite systems, equipment carried by troops or military vehicles, and the like. This can include substantially any type of control, communications module, computer, Input/Output (I/O) device, sensor, actuator, and human machine interface (HMI) that communicate via the network, which includes control, automation, and/or public networks.

The network can include public networks such as the internet, intranets, automation networks, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 15:
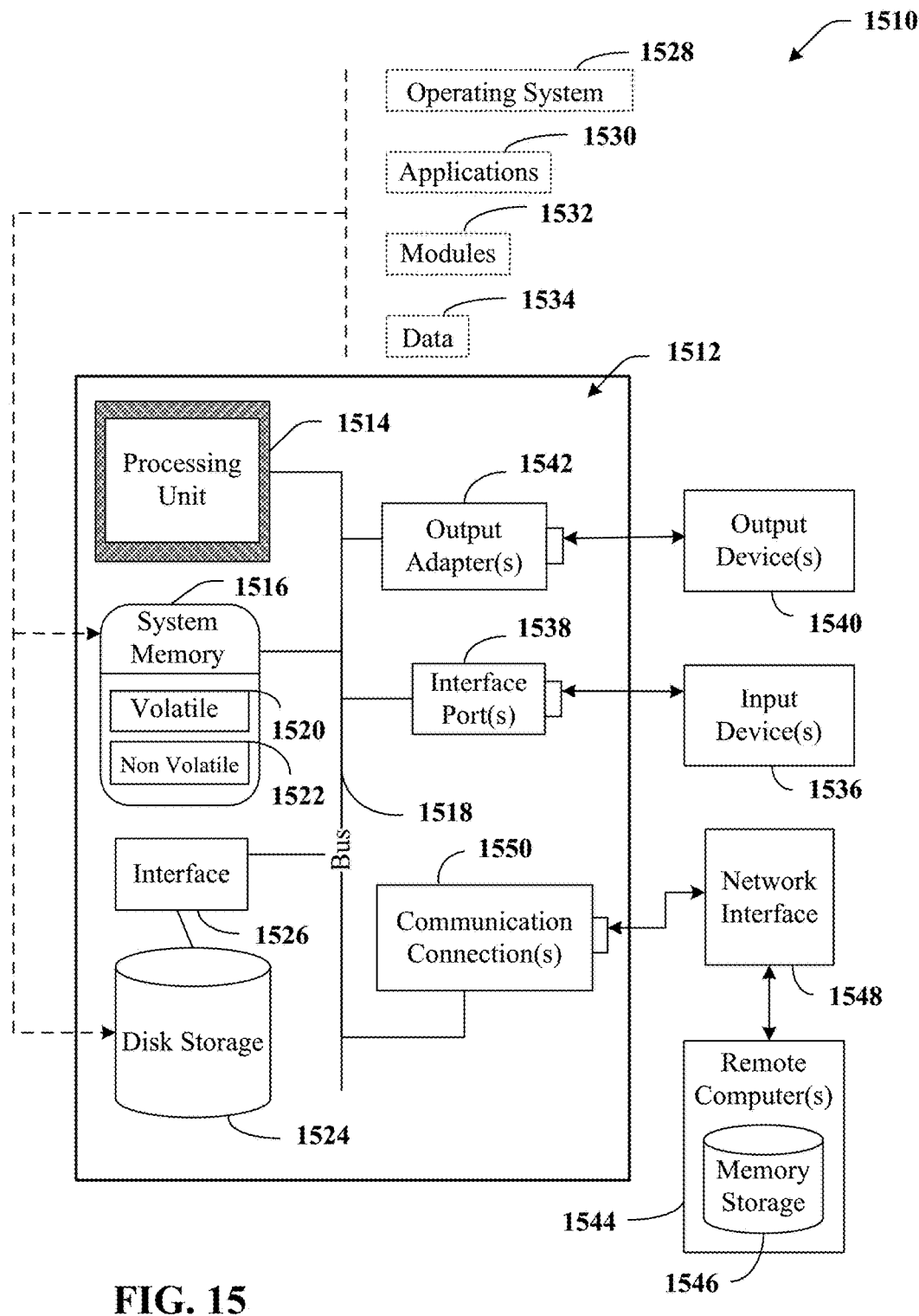
FIG. 15 is an example computing environment.
Figure 16:
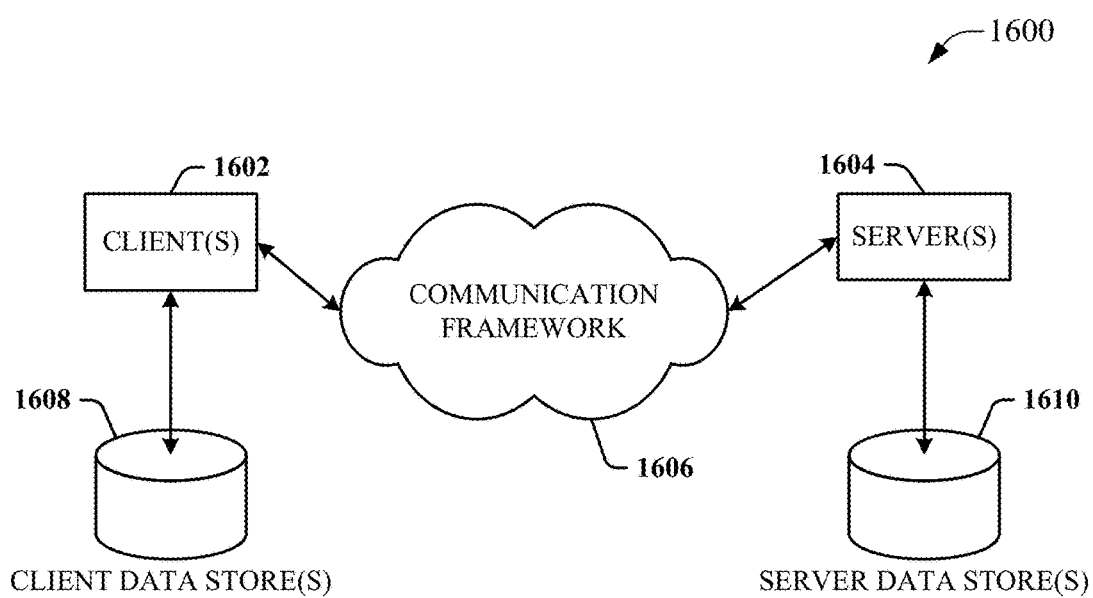
FIG. 16 is an example networking environment.

In order to provide a context for the various aspects of the disclosed subject matter, FIGS. 15 and 16 as well as the following discussion are intended to provide a brief, general description of a suitable environment in which the various aspects of the disclosed subject matter may be implemented.

With reference to FIG. 15, an example environment 1510 for implementing various aspects of the aforementioned subject matter includes a computer 1512. The computer 1512 includes a processing unit 1514, a system memory 1516, and a system bus 1518. The system bus 1518 couples system components including, but not limited to, the system memory 1516 to the processing unit 1514. The processing unit 1514 can be any of various available processors. Dual microprocessors and other multiprocessor architectures also can be employed as the processing unit 1514.

The system bus 1518 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1516 includes volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable PROM (EEPROM), or flash memory. Volatile memory 1520 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1512 also includes removable/non-removable, volatile/nonvolatile computer storage media. FIG. 15 illustrates, for example a disk storage 1524. Disk storage 1524 includes, but is not limited to, devices like a magnetic disk drive, floppy disk drive, tape drive, Jaz drive, Zip drive, LS-100 drive, flash memory card, or memory stick. In addition, disk storage 1524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1524 to the system bus 1518, a removable or non-removable interface is typically used such as interface 1526.

It is to be appreciated that FIG. 15 describes software that acts as an intermediary between users (e.g., a pilot) and the basic computer resources described in suitable operating environment 1510. Such software includes an operating system 1528. Operating system 1528, which can be stored on disk storage 1524, acts to control and allocate resources of the computer system 1512. System applications 1530 take advantage of the management of resources by operating system 1528 through program modules 1532 and program data 1534 stored either in system memory 1516 or on disk storage 1524. It is to be appreciated that one or more embodiments of the subject disclosure can be implemented with various operating systems or combinations of operating systems.

A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port may be used to provide input to computer 1512, and to output information from computer 1512 to an output device 1540. Output adapter 1542 is provided to illustrate that there are some output devices 1540 like monitors, speakers, and printers, among other output devices 1540, which require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a personal computer, a server, a router, a network PC, a workstation, a microprocessor based appliance, a peer device or other common network node and the like, and typically includes many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1550 refers to the hardware/software employed to connect the network interface 1548 to the bus 1518. While communication connection 1550 is shown for illustrative clarity inside computer 1512, it can also be external to computer 1512. The hardware/software necessary for connection to the network interface 1548 includes, for exemplary purposes only, internal and external technologies such as, modems including regular telephone grade modems, cable modems and DSL modems, ISDN adapters, and Ethernet cards.

FIG. 16 is a schematic block diagram of a sample-computing environment 1600 with which the disclosed subject matter can interact. The system 1600 includes one or more client(s) 1610. The client(s) 1610 can be hardware and/or software (e.g., threads, processes, computing devices). The system 1600 also includes one or more server(s) 1630. The server(s) 1630 can also be hardware and/or software (e.g., threads, processes, computing devices). The servers 1630 can house threads to perform transformations by employing one or more embodiments as described herein, for example. One possible communication between a client 1610 and a server 1630 can be in the form of a data packet adapted to be transmitted between two or more computer processes (e.g., a process running on the helicopter 460 and a process running on an external system 980). System 1600 includes a communication framework 1650 that can be employed to facilitate communications between the client(s) 1610 and the server(s) 1630. The client(s) 1610 are operably connected to one or more client data store(s) 1660 that can be employed to store information local to the client(s) 1610. Similarly, the server(s) 1630 are operably connected to one or more server data store(s) 1640 that can be employed to store information local to the servers 1630.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removably affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising".

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

What is claimed is:

1. A method comprising:
   sensing a shockwave associated with a projectile, in response to the shockwave impinging on a plate, wherein the shockwave results in resonance being generated in the plate, wherein a piezo electric sensor is associated with the plate, wherein the piezo electric sensor senses the shockwave having a first frequency, wherein the sensing of the shockwave is isolated from an effect of an acoustic wave that is in proximity to the plate and has a second frequency, wherein the acoustic wave is associated with at least operational noise of a vehicle, wherein the sensing of the shockwave is isolated from the effect of the acoustic wave to facilitate the sensing of the shockwave associated with the projectile without the sensing of the shockwave being affected by the acoustic wave, and wherein the first frequency is higher than the second frequency; and
   generating a signal in response to the sensing of the shockwave, wherein the signal is generated by the piezo electric sensor.

2. The method of claim 1, wherein the plate is formed to have a quality factor resonance that satisfies a defined quality factor criterion.

3. The method of claim 1, wherein the shockwave is generated in response to the projectile passing in proximity of the plate.

4. The method of claim 3, wherein the projectile is a bullet travelling at supersonic velocity.

5. The method of claim 3, further comprising analyzing the signal to facilitate determining a trajectory of the projectile.

6. The method of claim 2, further comprising combining the signal with another signal received from another piezo electric sensor associated with another plate, wherein the other signal is generated by another shockwave associated with the projectile in proximity of the other plate.

7. The method of claim 6, further comprising analyzing the signal and the other signal to facilitate determining a trajectory of the projectile.

8. The method of claim 7, further comprising presenting information indicating the trajectory on a visual display component.

9. The method of claim 7, further comprising transmitting information indicating the trajectory to a component remotely located from at least one of the plate or the other plate.

10. The method of claim 7, wherein at least one of the plate or the other plate comprises aluminum.

11. A system comprising:
a first plate; and
a first piezo electric sensor, wherein the first piezo electric sensor is attached to the first plate and generates a first electrical signal in response to the first plate resonating under the influence of a first shockwave incident upon the first plate, wherein the first piezo electric sensor senses the first shockwave having a first frequency without being negatively affected by an acoustic wave having a second frequency to facilitate the sensing of the first shockwave associated with movement of a projectile without the sensing of the first shockwave being negatively affected by the acoustic wave that is associated with at least a noise produced by a vehicle, and wherein the first frequency is higher than the second frequency.

12. The system of claim 11, wherein the first shockwave is generated by the projectile having a trajectory proximate to the first plate.

13. The system of claim 12, wherein the projectile is an arms round.

14. The system of claim 12, further comprising:
a second plate; and
a second piezo electric sensor, wherein the second piezo electric sensor is attached to the second plate and generates a second electrical signal in response to the second plate resonating under the influence of a second shockwave incident upon the second plate, and wherein the second shockwave is generated by the projectile.

15. The system of claim 14, further comprising:
a projectile direction and source location (PDSL) component configured to receive the first electrical signal and the second electrical signal.

16. The system of claim 15, wherein the PDSL component is further configured to analyze the first electrical signal and the second electrical signal to facilitate determination of the trajectory of the projectile.

17. The system of claim 16, wherein the PDSL component is further configured to extrapolate the trajectory of the projectile to facilitate determination of a location of a source of the projectile.

18. The system of claim 17, further comprising a visual display component configured to present at least one of first information indicating the trajectory of the projectile or second information indicating the location of the source of the projectile.

19. A non-transitory computer-readable storage medium comprising a set of instructions that, in response to execution, cause a computing system to perform operations, comprising:
receiving a signal from a resonant sensor attached to a plate, wherein the signal is generated in response to a shockwave impinging on the plate generating resonance in the plate causing the resonant sensor to generate the signal, wherein the resonant sensor senses the shockwave having a first frequency without being negatively impacted by another wave that is in proximity to the plate and has a second frequency to facilitate capturing the shockwave associated with movement of a projectile without the capturing of the shockwave being negatively impacted by the other wave that is associated with at least operational noise associated with a vehicle, and wherein the first frequency is higher than the second frequency; and
determining, in response to the received signal, a trajectory of the projectile generating the shockwave.

20. The non-transitory computer-readable storage medium of claim 19, the operations further comprising determining a location of the source of the projectile.

\* \* \* \* \*